United States Patent
Yoon

(10) Patent No.: US 10,561,933 B2
(45) Date of Patent: Feb. 18, 2020

(54) GAME METHODS FOR CONTROLLING GAME USING VIRTUAL BUTTONS AND SYSTEMS FOR PERFORMING THE SAME

(71) Applicants: LINE Up Corporation, Seongnam-si, Gyeonggi-do (KR); LINE Studio Corporation, Seongnam-si, Gyeonggi-do (KR)

(72) Inventor: Kyoung Ho Yoon, Seongnam-si (KR)

(73) Assignees: LINE UP CORPORATION, Gyeonggi-do (KR); LINE STUDIO CORPORATION, Gyeonggi-do (KR)

( * ) Notice: Subject to any disclaimer, the term of this patent is extended or adjusted under 35 U.S.C. 154(b) by 978 days.

(21) Appl. No.: 14/837,826

(22) Filed: Aug. 27, 2015

(65) Prior Publication Data

US 2016/0199728 A1    Jul. 14, 2016

(30) Foreign Application Priority Data

Jan. 8, 2015    (KR) .................. 10-2015-0002560

(51) Int. Cl.
*A63F 13/00*    (2014.01)
*A63F 13/2145*    (2014.01)
(Continued)

(52) U.S. Cl.
CPC ........ *A63F 13/2145* (2014.09); *G06F 3/0488* (2013.01); *G06F 3/04845* (2013.01)

(58) Field of Classification Search
CPC ............... A63F 13/2145; A63F 13/426; G06F 3/04845; G06F 3/0488
See application file for complete search history.

(56) References Cited

U.S. PATENT DOCUMENTS

2013/0260893 A1    10/2013   Shin et al.
2013/0316813 A1*   11/2013   Derome ................... A63F 9/24
                                                    463/31
(Continued)

FOREIGN PATENT DOCUMENTS

JP    2004073682 A    3/2004
JP    2012115325 A    6/2012
(Continued)

OTHER PUBLICATIONS

"Clash of Clans".*

(Continued)

*Primary Examiner* — David L Lewis
*Assistant Examiner* — Eric M Thomas
(74) *Attorney, Agent, or Firm* — Harness, Dickey & Pierce, P.L.C.

(57) ABSTRACT

Game methods for controlling a game using virtual buttons and/or systems for performing the same are provided. The game method includes determining, by a processor of the computer, whether a virtual button is selected by a user from among one or more virtual buttons displayed on a touch screen of the game system, controlling, by the processor, a game in progress according to an input event of the user, which is input through a second portion of the touch screen, the second portion being different from the first portion, and performing, by the processor, different controls according to the virtual buttons respectively selected by the user.

18 Claims, 9 Drawing Sheets

(51) Int. Cl.
    G06F 3/0484    (2013.01)
    G06F 3/0488    (2013.01)

(56) References Cited

U.S. PATENT DOCUMENTS

2013/0316829 A1* 11/2013 Derome .................. A63F 9/24
                                                    463/37
2013/0332543 A1    12/2013 Shin et al.
2014/0019540 A1     1/2014 Shin et al.
2014/0143732 A1*  5/2014 Haussila ............... G06F 3/0481
                                                    715/845

FOREIGN PATENT DOCUMENTS

KR            101051068 B1     7/2011
KR       1020130112586 A      10/2013
WO       WO-2015/065001 A1    5/2015

OTHER PUBLICATIONS

Gamespot review of "Clash of Clans".*
"Kane & Lynch" game manual (Year: 2007).*
"Clash of Clans" strategy guide (Year: 2013).*

* cited by examiner

GAME METHODS FOR CONTROLLING GAME USING VIRTUAL BUTTONS AND SYSTEMS FOR PERFORMING THE SAME

CROSS-REFERENCE TO RELATED APPLICATIONS

A claim for priority under 35 U.S.C. § 119 is made to Korean Patent Application No. 10-2015-0002560, filed Jan. 8, 2015 in the Korean Intellectual Property Office, the entire contents of which are hereby incorporated by reference.

BACKGROUND

Some example embodiments of the inventive concepts described herein relate to game methods for controlling a game using virtual buttons, and/or systems for performing the same.

In game systems, a dual pad such as a joystick, which includes a stick and buttons, or a separate input device such as a keyboard or a mouse has been widely used. In mobile or hand-held game systems (e.g., smart phone), it is difficult to accommodate such input devices. Thus, a touch screen is being widely used as an input device instead.

For the hand-held game systems, many attempts have been made to provide an input interface that emulates an operation of the dual pad. In the event that the dual pad is displayed on a touch screen of a hand-held game system, the touch screen is crowded and a proportion at which an input interface occupies the touch screen increases.

Thus, users may feel a limitation or restriction on a touch operation while performing, for example, a roll playing game (RPG) game or a simulation game. For example, most hand-held game systems provide the dual pad interface on the touch screen by copying the real dual pad (e.g., real joystick), which controls characters using, for example, left stick interfaces, and selects skills using, for example, right button interfaces. Because users perform complicated control such as selecting skills, taking aim at targets (targeting), charging targets, and/or activating skills, using the right button interface alone, the users may experience various inconveniences during operation.

Further, because a plurality of button interfaces occupy a substantial proportion of a touch screen of the hand-held game system, another skill button may be inadvertently pushed in a process of targeting objects or while no function for targeted objects are not performed. Thus, it is difficult for users to precisely select skills, taking aim at targets, charging targets, and/or activating skills through one action (e.g., by pushing one skill button).

SUMMARY

Some example embodiments of the inventive concepts provide game methods, each of which provide a virtual button for selecting a skill, and performs a variety of controls according to the virtual button selected by a user and an input event of the user on a touch screen, and/or a system for performing the methods.

According to an example embodiment of the inventive concepts, a game method in a game system implemented with a computer includes determining, by a processor of the computer, whether a virtual button is selected by a user from among one or more virtual buttons displayed on a first portion of a touch screen of the game system, controlling, by the processor, a game in progress according to an input event of the user, which is input through a second portion of the touch screen, the second portion being different from the first portion, and performing, by the processor, different controls according to the virtual buttons respectively selected by the user.

According to an example embodiment of the inventive concepts, a non-transitory computer-readable medium having embodied thereon instructions that when executed by a processor to cause the processor to perform the foregoing method may be provided.

According to an example embodiment of the inventive concepts, a game system implemented with a computer includes a memory having computer-readable instructions stored thereon, and at least one processor configured to execute the computer-readable instructions which configure the processor to determine whether a virtual button displayed on a first portion of a touch screen is selected by a user from among one or more virtual buttons, control a game in progress according to an input event of the user, which is input through a second portion of the touch screen, the second portion being different from the first portion, and perform different controls according to the virtual buttons respectively selected by the user.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
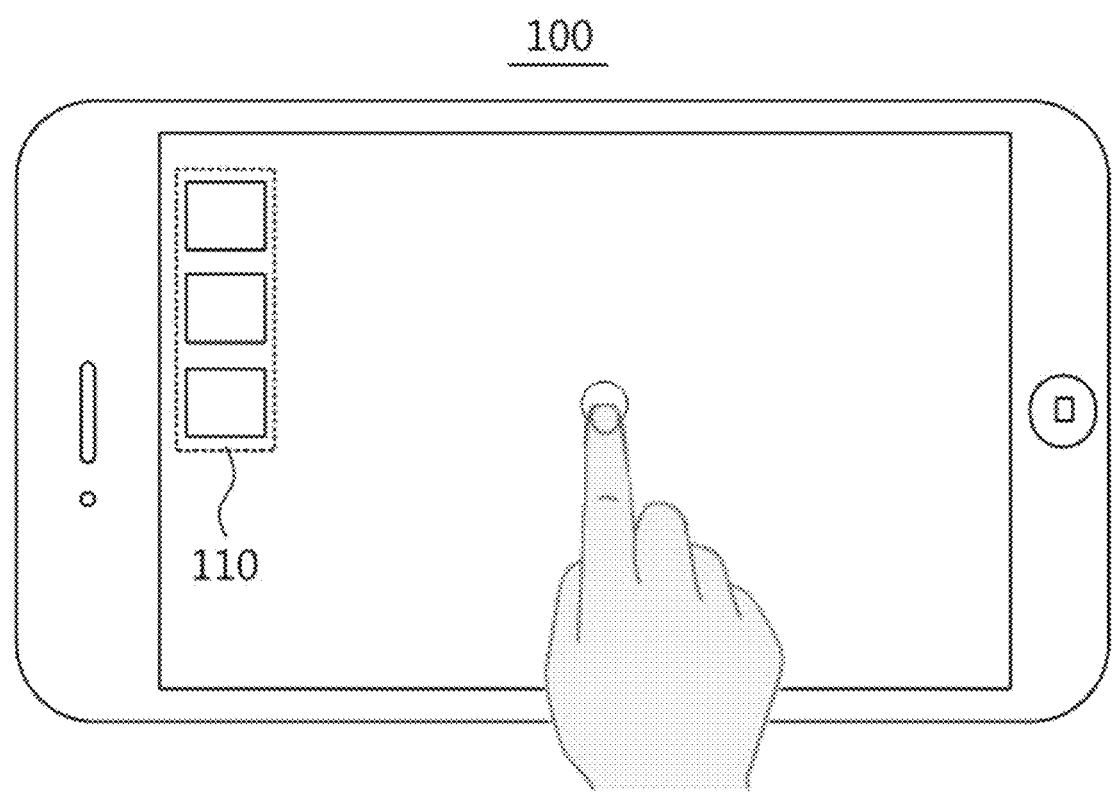
FIG. 1 is a drawing illustrating a user terminal on which virtual buttons are disposed according to an example embodiment of the inventive concepts.

Various example embodiments of the inventive concepts will be described in detail with reference to the accompanying drawings. The inventive concepts, however, may be embodied in various different forms, and should not be construed as being limited only to the illustrated example embodiments. Rather, these example embodiments are provided as examples so that this disclosure will be thorough and complete, and will fully convey the inventive concepts to those skilled in the art. Accordingly, known processes, elements, and techniques are not described with respect to some of the example embodiments of the inventive concepts. Unless otherwise noted, like reference numerals denote like elements throughout the attached drawings and written description, and thus descriptions will not be repeated. In the drawings, the sizes and relative sizes of layers and regions may be exaggerated for clarity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the inventive concepts.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular example embodiments only and is not intended to be limiting of the inventive concepts. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present.

Unless otherwise defined, all terms (including technical and scientific terms) used herein have the same meaning as commonly understood by one of ordinary skill in the art to which this inventive concepts belong. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

Hereinafter, a description will be given in detail for some example embodiments of the inventive concepts with reference to the accompanying drawings.

Example embodiments of the inventive concepts relate to a game system for providing a new game operation interface in a touch screen environment and a method therefor. The game system according to example embodiments of the inventive concepts may be a user terminal when the user terminal provides a game service for itself. In other example embodiments of the inventive concepts, the game system may be a server device which communicates with a user terminal and provides a game service to the user terminal.

FIG. 1 is a drawing illustrating a user terminal on which virtual buttons are disposed according to an example embodiment of the inventive concepts. A user terminal 100 may be a device including a touch screen. FIG. 1 illustrates an example, in which a plurality of virtual buttons 110 are displayed on the touch screen of the user terminal 100.

A game system may determine whether a user selects a virtual button displayed on the touch screen. For one example, when the user touches one of the plurality of virtual buttons 110 displayed on a left side of the touch screen, the game system may determine that the user selects the virtual button. In this case, when the touch of the user on the corresponding virtual button is released, the game system may determine that the selection for the virtual button is released. For another example, when one virtual button is touched, the game system may determine that the corresponding virtual button is selected. When the corresponding virtual button is touched again, the game system may determine that the selection for the corresponding virtual button is released.

According to some example embodiments, the game system may control a game in progress according to an input event of the user, which is input through a region of the touch screen, which is other than a region of the touch screen at which a virtual button is displayed. The game system may perform different controls with respect to the same input event of the user, depending on whether a virtual button is selected or not.

For example, as shown in FIG. 1, the user may touch a region (hereinafter, referred to as a game region) other than a region (hereinafter, referred to as a virtual button region) at which the plurality of virtual buttons 110 are displayed and control a game. For one example, when the user touches a specific position of the game region, the game system may move a character of the user to the specific position. For another example, when the user touches a specific object displayed on the game region, the game system may move the character of the user towards the specific object.

Meanwhile, the plurality of virtual buttons 110 may be used for special purposes. For example, the plurality of virtual buttons 110 may correspond to a plurality of skills, respectively. When an input event occurs on the game region in a state where the user touches one of the plurality of virtual buttons 110, the game system may control various functions according to the touched virtual button.

As shown in FIG. 1, the virtual button may include a plurality of virtual buttons, which are displayed on different regions. The game system may perform different controls with respect to combinations of a kind of a virtual button selected among the plurality of virtual buttons and a kind of an input event of the user, respectively.

Figure 2:
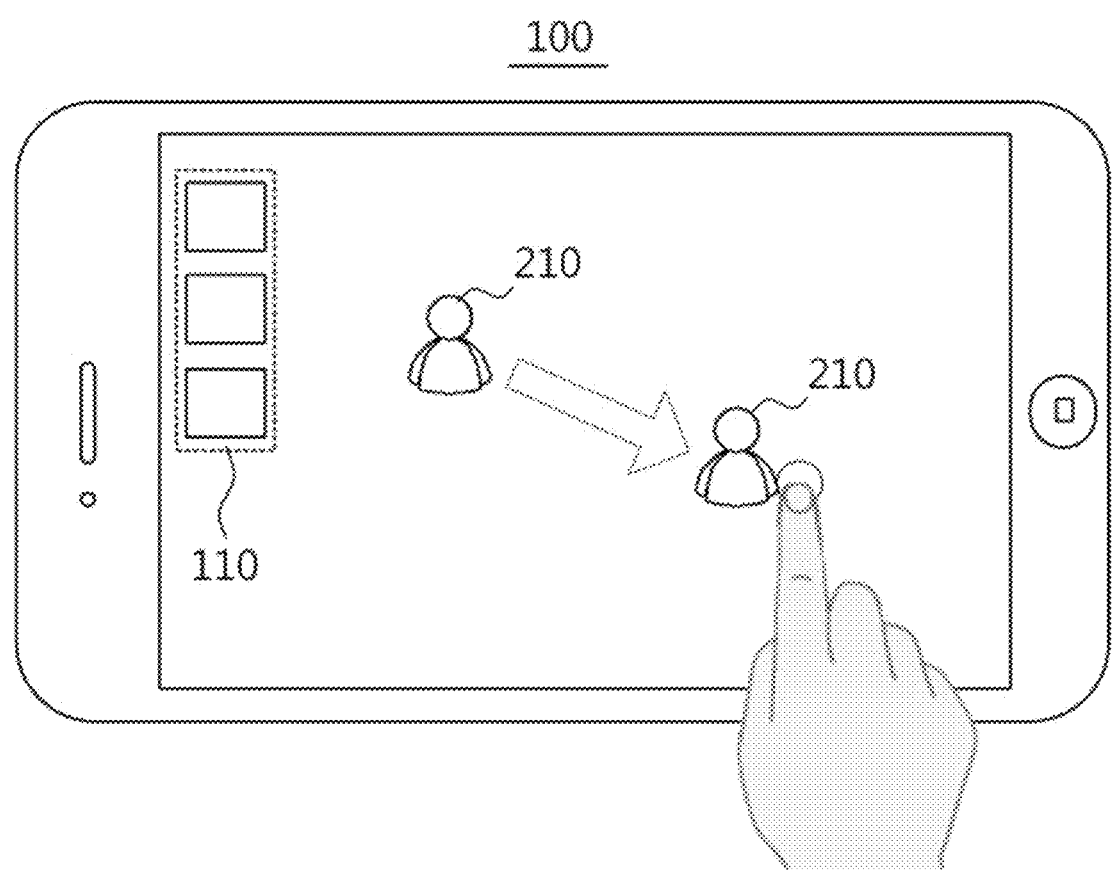
FIG. 2 is a drawing illustrating a process of moving a character according to an example embodiment of the inventive concepts.
Figure 3:
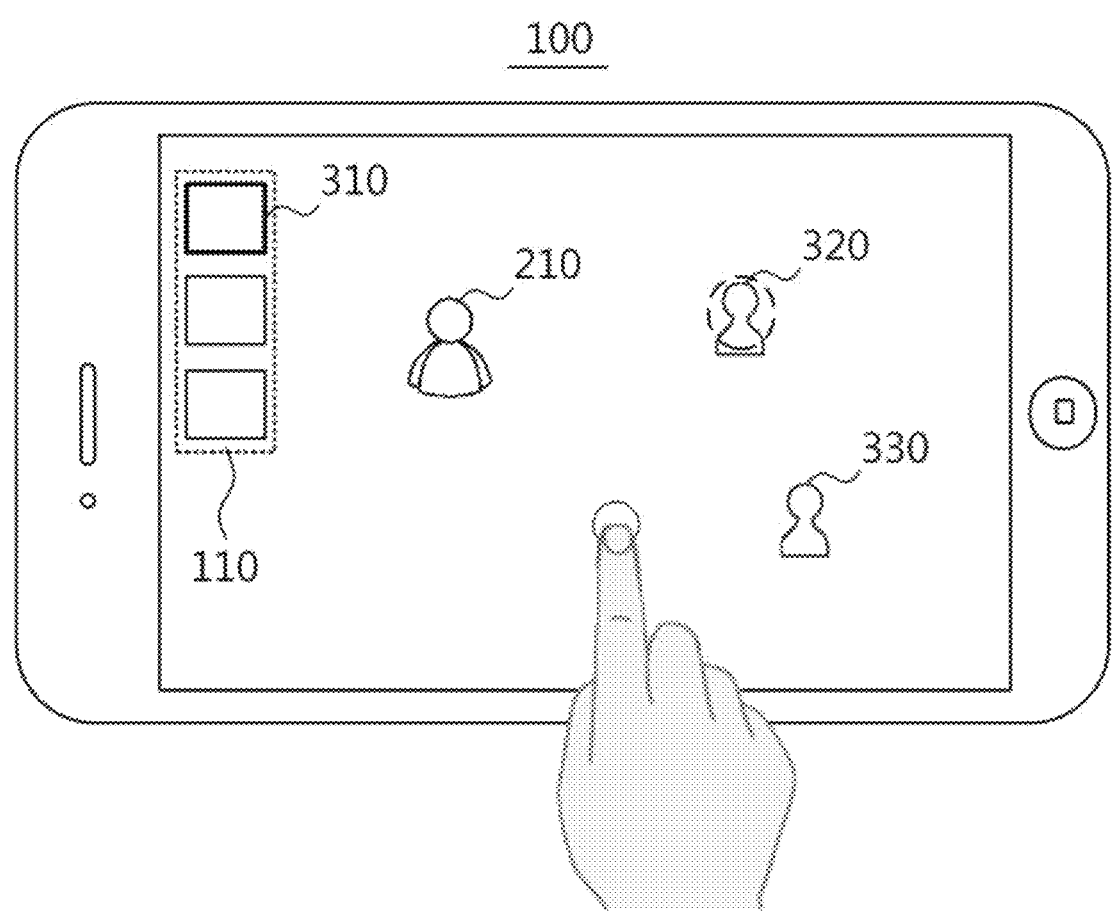
FIG. 3 is a drawing illustrating a process of activating a skill according to an example embodiment of the inventive concepts.

FIG. 2 is a drawing illustrating a process of moving a character according to an example embodiment of the inventive concepts. FIG. 3 is a drawing illustrating a process of activating a skill according to an example embodiment of the inventive concepts.

First of all, FIG. 2 illustrates an example in which a character 210 of a user moves to a specific position of a game region touched by a user in a state where a virtual button from among a plurality of virtual buttons 110 is not selected by the user.

In contrast, FIG. 3 illustrates an example in which an object 320 is targeted as the user touches the game region in a state where a first virtual button 310 of the plurality of virtual buttons 110 is selected by the user. When a plurality of objects (e.g., an object 320 and an object 330) are present, the closest object 320 to the character 210 of the user may be targeted. Precise and accurate touch and selection of a specific target object on a relatively small touch screen demands a very accurate (e.g., high-precision) operation by the user especially when a large number of objects are present. According to some example embodiments of the inventive concepts, however, the closest object 320 to the character 210 of the user may first be targeted even when the specific target object is not precisely touched. In other words, when the user touches any position on the game region (meaning when the user does not precisely touch a specific target object), the object 320 may be targeted. Further, when a touch of the user accurately touches a specific object, the specific object may be selected by the touch of the user. However, the scope and spirit of the inventive concepts may not be limited thereto.

According to some example embodiments, when the user releases the touch on the game region, a skill associated with the first virtual button 310 may be activated for the targeted object 320. For example, the skill associated with the first virtual button 310 may be selectively applied to the selected targeted object 320. The skill associated with the first virtual button 310 may be applied to objects included in a certain range around the targeted object 320 according to a kind of the associated skill. In some example embodiments, the skill may be applied to a plurality of objects, including the character 210 of the user, which are included in a linear range which connects the character 210 of the user with the targeted object 320 according to a kind of the associated skill.

As such, according to an example embodiment of the inventive concepts, all of selection of a skill, selection of an object, and activation of a skill may be controlled by one action (e.g., an action of touching a desired position of the game region on the touch screen in a state where the user touches a virtual button associated with a corresponding skill) of the user in a state where a plurality of objects are present.

According to some example embodiments of the inventive concepts, different controls may be performed for the same input event (e.g., a touch event) of the user on the game region according to whether or not the user selects a virtual button from among the plurality of virtual buttons. Further, different controls for the same input event of the user may be performed according to a skill associated with a specific virtual button when the user touches the specific virtual button from among the plurality of virtual buttons.

When the selection of a specific virtual button is verified and an activation condition associated with the input event of the user is satisfied, a game system may activate a specific skill associated with the virtual button. In contrast, when the user releases the selection of the specific virtual button before the activation condition is satisfied, the game system may cancel the activation of the skill associated with the specific virtual button. For example, as described with reference to FIG. 3, when the user precisely touches the object 320 or touches a game region in the vicinity of the object 320 in the state where the first virtual button 310 from among the plurality of virtual buttons is selected by a user, the game system may target the object 320. Thus, when the user releases the touch on the object 320, the game system may activate or apply a skill associated with the first virtual button 310 to the object 320. Further, when the user releases the selection of the first virtual button 310 in a state where the object 320 is kept touched by the user, the game system may cancel the activation or application of the skill associated with the first virtual button 310. Accordingly, although the user releases the touch on the object 320, the game system may not activate a skill associated with a selected one of the plurality of virtual buttons if an activation condition for an input event of the user for the associated skill is not met. For example, when the user releases a virtual button associated with a skill before an activation condition is satisfied, the game system may cancel activation of the skill associated with the virtual button.

Figure 4:
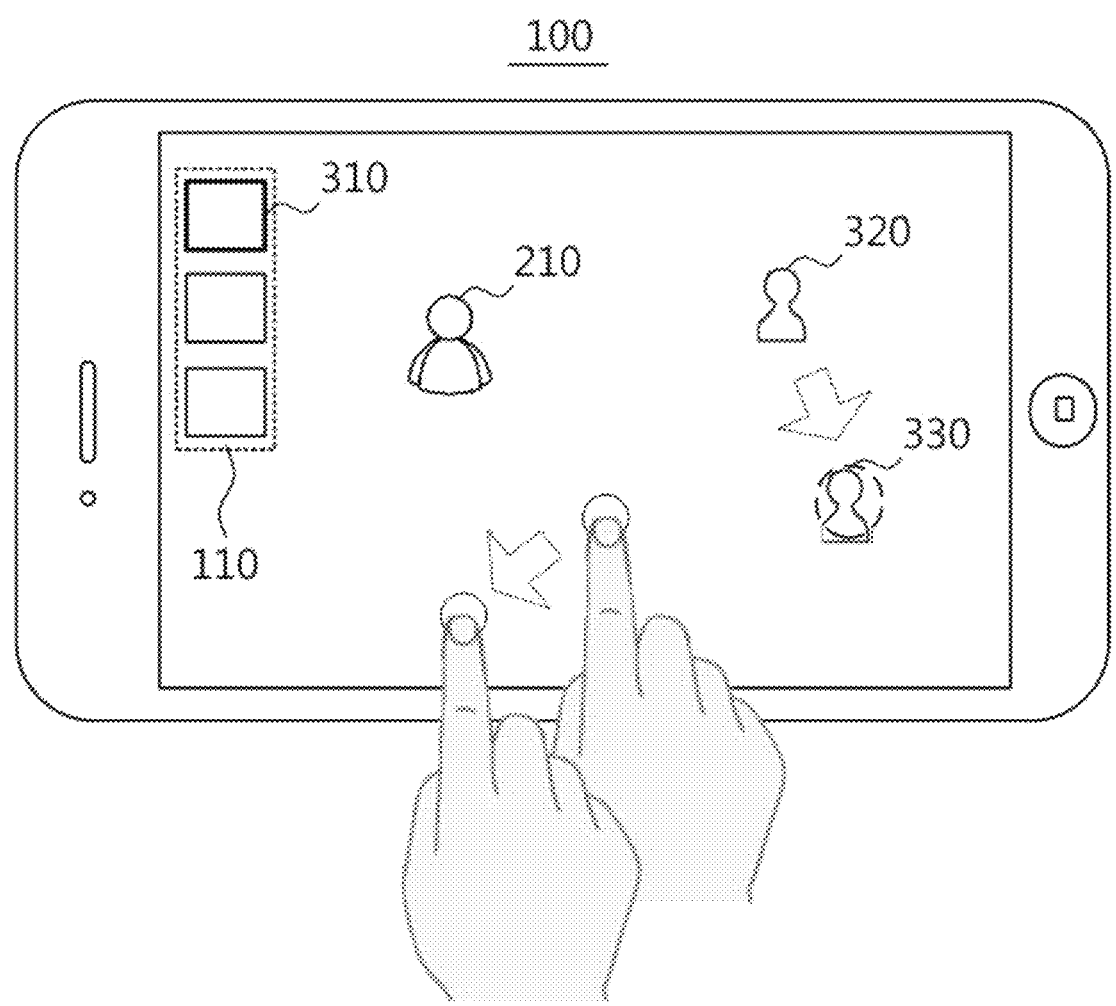
FIG. 4 is a drawing illustrating a process of controlling a change of a target object according to an example embodiment of the inventive concepts.

FIG. 4 is a drawing illustrating a process of controlling a change of a target object according to an example embodiment of the inventive concepts. FIG. 4 illustrates an example in which a target object is changed from an object 320 to another object 330 as a user drags a touch on a game region while continuously touching the game region. In some example embodiments, an object to be targeted may be selected according to a distance from a character 210 of the user. For example, the object 320 closest to the character 210 may first be selected. Then, objects may be sequentially targeted per drag of the user in the order of being close to the character 210 of the user. When the user releases the touch on the game region in a state where the object 330 is selected, a skill associated with a first virtual button 310 may be activated for or applied to the currently targeted object 330.

Figure 5:
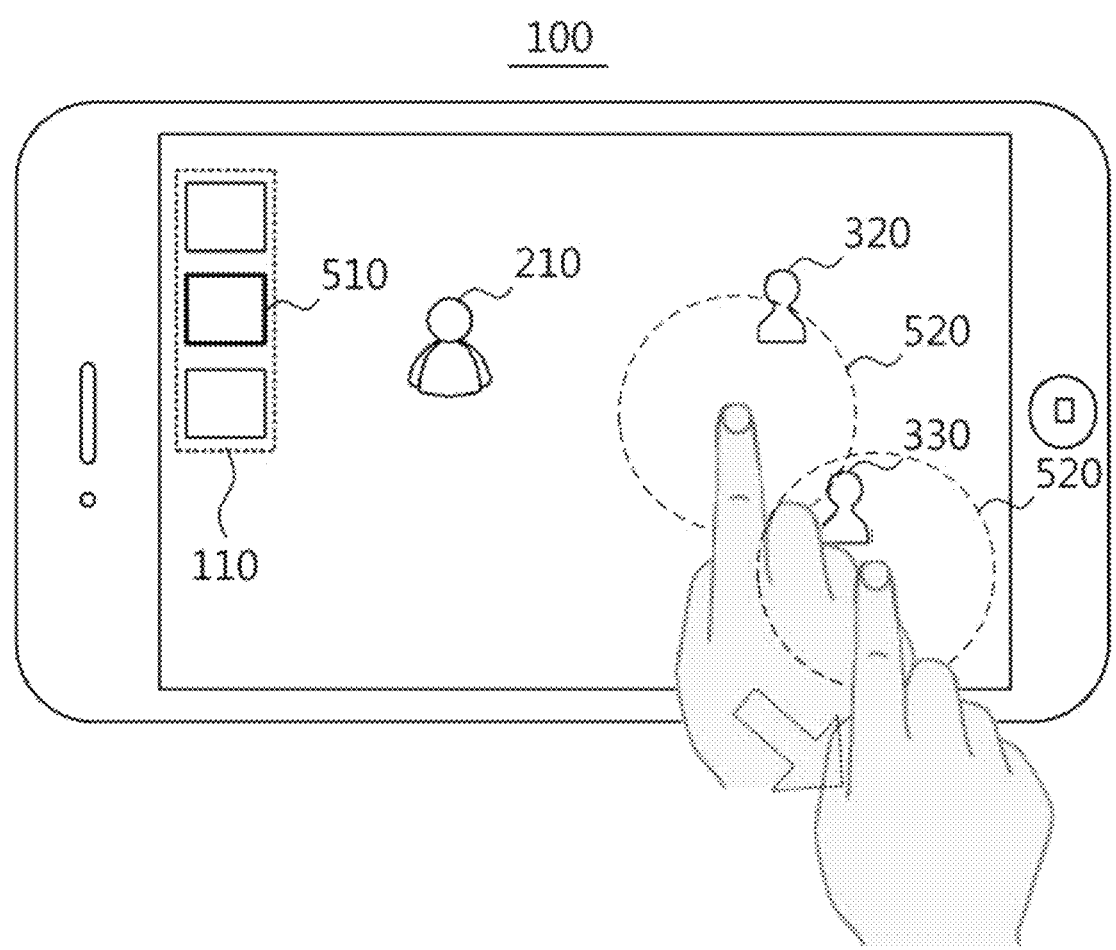
FIG. 5 is a drawing illustrating a process of using a touch peripheral range skill according to an example embodiment of the inventive concepts.

FIG. 5 is a drawing illustrating a process of using a touch peripheral range skill according to an example embodiment of the inventive concepts. The touch peripheral range skill may mean a skill which is applied to a certain range around a touch point on the touch screen temporarily or continuously during a certain time.

FIG. 5 illustrates an example in which an application range of the touch peripheral range skill is displayed by a first dotted circle 520 around a touch point when the user touches a game region in a state where a second virtual button 510, which is associated with the touch peripheral range skill, is selected by a user.

When the user releases the touch of the game region, the associated skill may be applied to a region displayed by the first dotted circle 520. For example, the associated skill may be applied to an object 320 located in the first dotted circle 520, and the associated skill may not be applied to an object 330 located out of the first dotted line 520.

This application range of the skill or a value corresponding to the associated skill may be changed according to duration of a touch input. For example, as the duration of the touch input becomes longer and longer, the first dotted circle 520 may increases in size or the power of a skill may increases.

In some example embodiments, when a touch point is changed through a drag of the user, the application range of the touch peripheral range skill may be changed from the first dotted circle 520 to a second dotted circle 530. Further, when the user releases the touch of the game region, the associated skill may be applied to the object 330 located in the second dotted circle 530.

Figure 6:
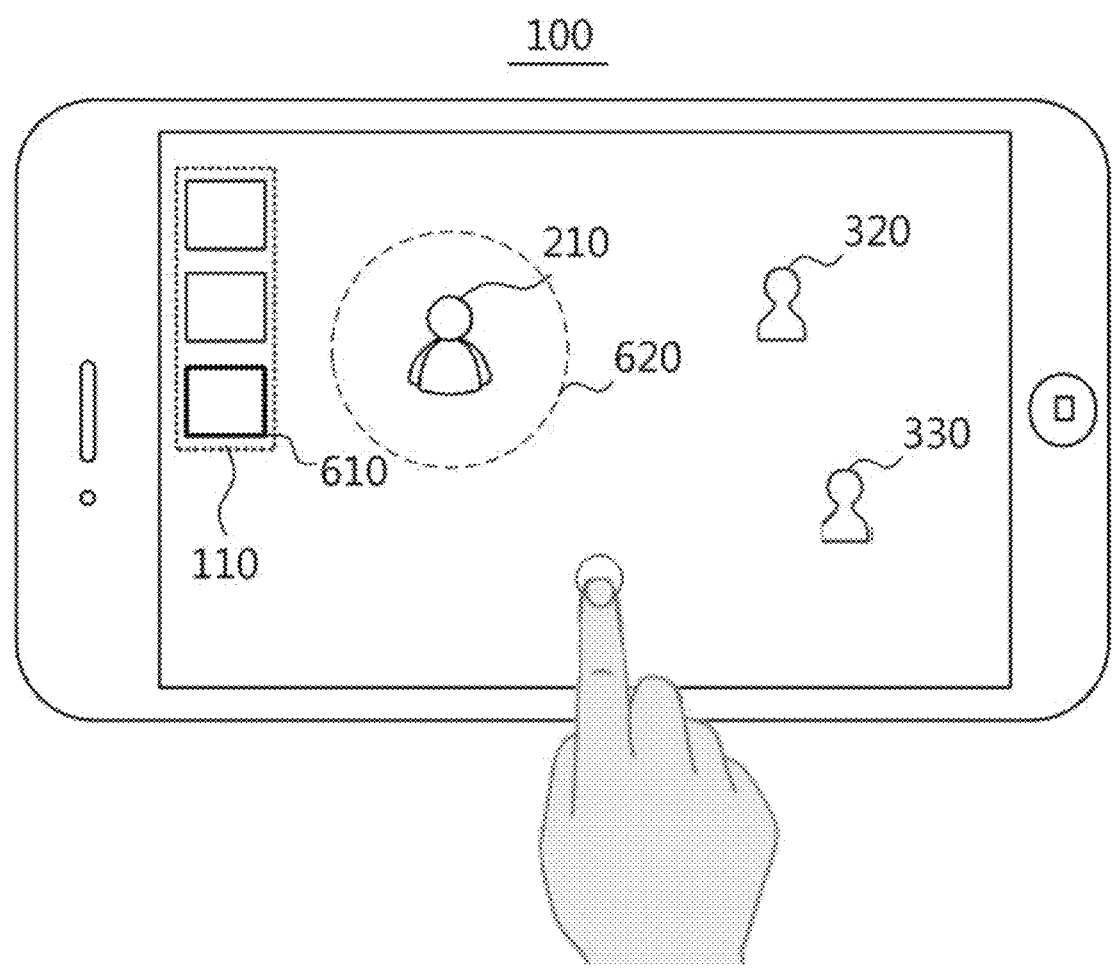
FIG. 6 is a drawing illustrating a process of using a character peripheral range skill according to an example embodiment of the inventive concepts.

FIG. 6 is a drawing illustrating a process of using a character peripheral range skill according to an example embodiment of the inventive concepts. The character peripheral range skill may include a skill applied to a certain range around a character 210 of a user.

Referring to FIG. 6, the user may touch a portion of a game region near the character 210 in a state where a third virtual button 610 associated with the character peripheral range skill is selected by a user. Then, a certain range as illustrated by the third dotted circle 620 around the character 210 of the user may be displayed on a touch screen. When the user releases the touch of the game region, a skill associated with the third virtual button 610 may be applied to the character 210 located in the third dotted circle 620. As described above, when the selection of the third virtual button 610 is released before the touch of the game region is released, activation of the associated skill may be cancelled.

Figure 7:
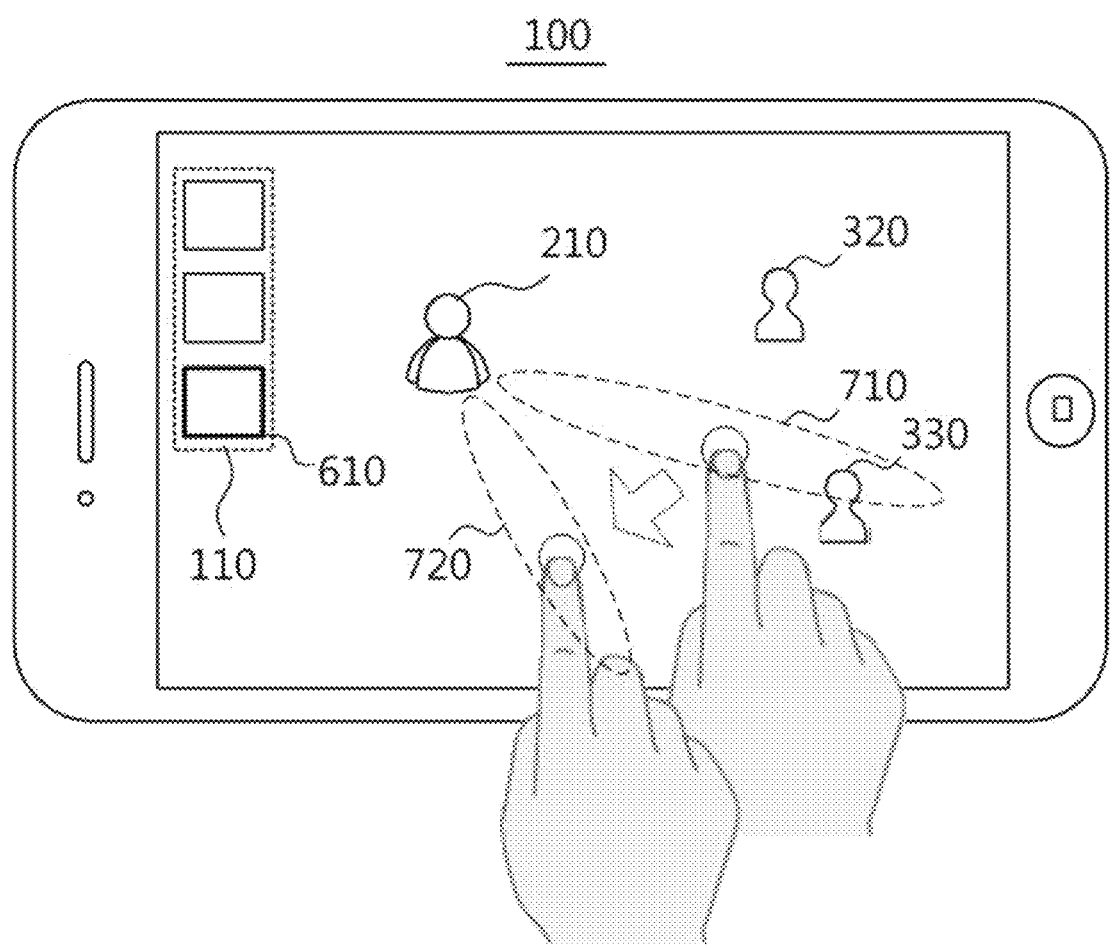
FIG. 7 is a drawing illustrating a process of using a directional skill according to an example embodiment of the inventive concepts.

FIG. 7 is a drawing illustrating a process of using a directional skill according to an example embodiment of the inventive concepts. The directional skill may include a skill which is applied in a specific direction with respect to a character 210 of a user.

According to some example embodiments, the third virtual button 610 may be associated with a directional skill rather than being associated with a character peripheral range skill, as illustrated in FIG. 6. The number of a plurality of virtual buttons 110 may be set as desired. Skills associated with respective virtual buttons 110 may be set or changed according to settings of the user. For example, skills associated with respective virtual buttons 100 may be preset according to the character 210 of the user.

When the user selects a game region in a state where the third virtual button 610 is selected by the user, a skill application range, such as a first dotted oval 710, may be displayed on a touch screen in a touch direction relative to the character 210 of the user. When the user drags a touch point on the game region, a skill application range, such as a second dotted oval 720, may change according to a touch position of the user. Further, when the user releases the touch of the game region, the skill associated with the selected third virtual button 610 may be applied to the resulting skill application range displayed on the touch screen.

In another example embodiment of the inventive concepts, when the user touches the game region in a state where the third virtual button 610 is selected by the user, a skill may be immediately activated for or applied to a touch direction relative to the character 210 of the user. This skill may be continuously applied while the touch of the user on the game region is maintained. When the touch of the user on the game region is released, the activation and application of the skill associated with the third virtual button 610 may also be released.

In another example embodiment of the inventive concepts, an application range of the directional skill or a value associated with the directional skill may change over duration of a touch input. For example, as the duration of the touch input becomes longer and longer, a skill application range in a touch direction may increase or the power of a skill may increase.

Some example embodiments relating to some kinds of skills are described above for understanding of the inventive concepts. However, the scope and spirit of the inventive concepts may not be limited thereto.

Figure 8:
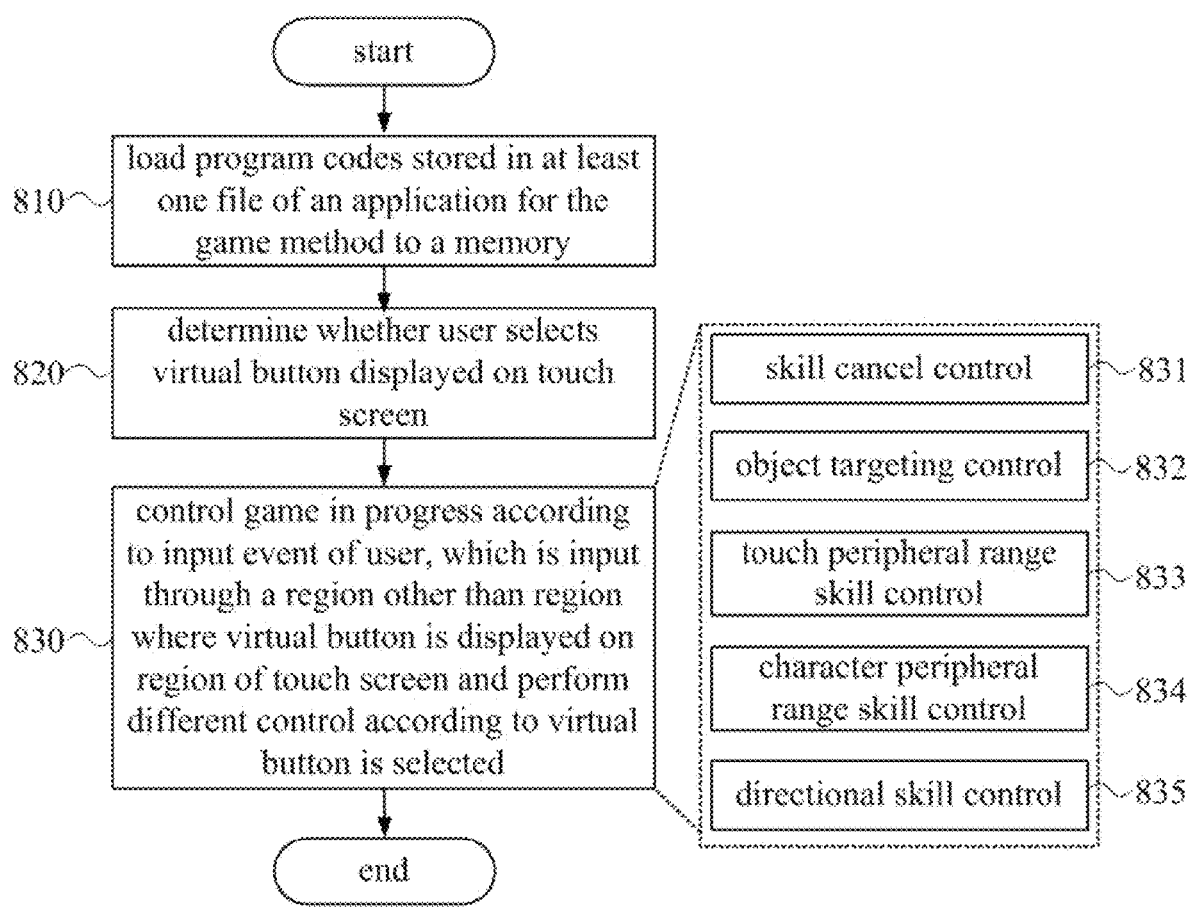
FIG. 8 is a flowchart illustrating an operation of a game method according to an example embodiment of the inventive concepts.
Figure 9:
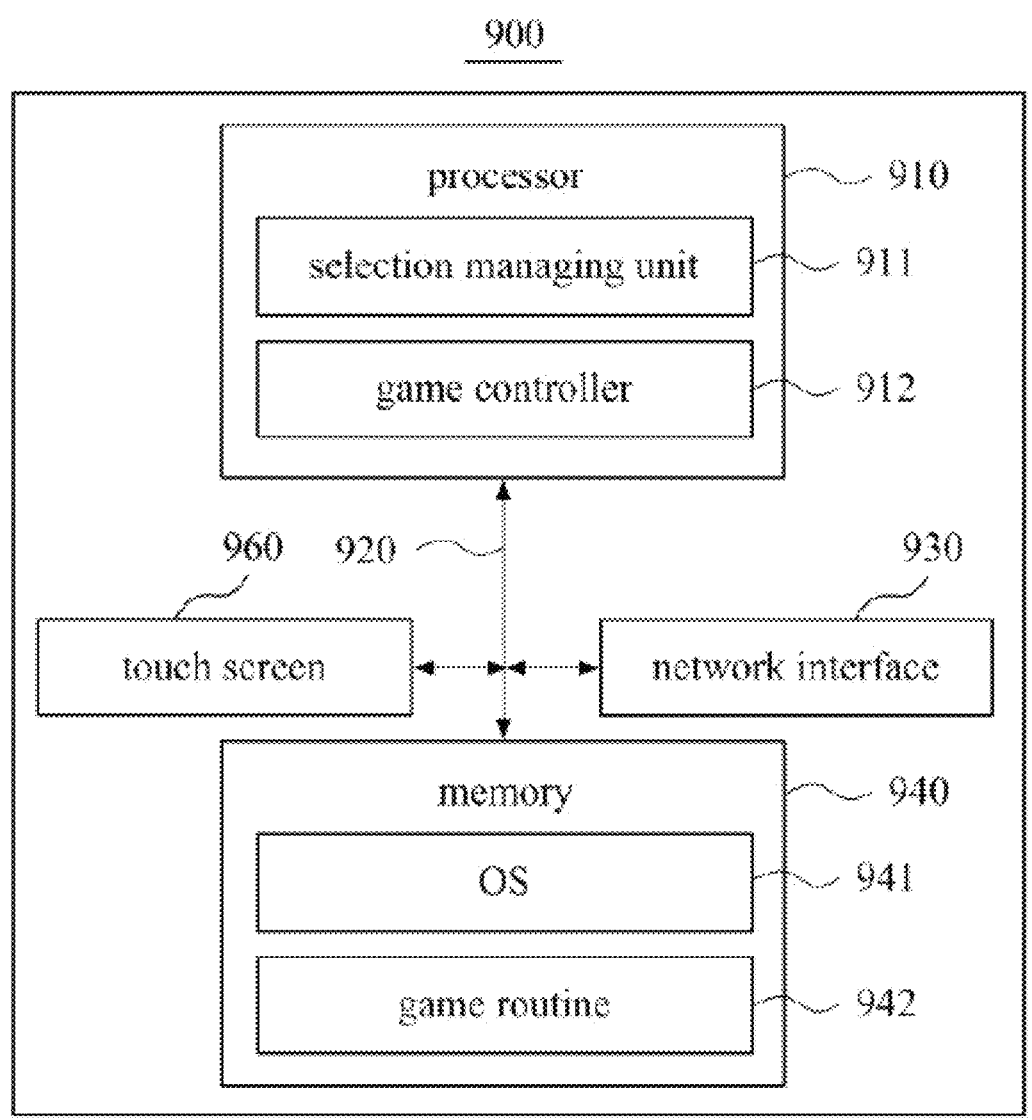
FIG. 9 is a block diagram illustrating a configuration of a game system according to an example embodiment of the inventive concepts.

FIG. 8 is a flowchart illustrating an operation of a game method according to an example embodiment of the inventive concepts. FIG. 9 is a block diagram illustrating a configuration of a game system according to an example embodiment of the inventive concepts.

A game system 900 according to an example embodiment of the inventive concepts may correspond to the game system described above. As shown in FIG. 9, the game system 900 may include a processor 910, a bus 920, a network interface 930, a memory 940, and a touch screen 960. The memory 940 may include an operating system (OS) 941 and a game routine 942. The processor 910 may be configured to include (e.g., by executing computer-readable instructions in the memory 940) a selection managing unit 911 and a game controller 912. In other example embodiments of the inventive concepts, the game system 900 may include more elements than those of FIG. 9. For example, the game system 900 may further include other elements such as a keyboard and/or a transceiver.

The memory 940 may be a computer-readable medium and may include permanent mass storage devices such as a random access memory (RAM), a read only memory (ROM), and a disc drive. Also, the memory 940 may store program codes for the OS 941 and the game routine 942. These software elements may be loaded to the memory 940 from a separate non-transitory computer-readable medium which is independent of the memory 940 using a drive mechanism (not shown). The separate non-transitory computer-readable medium may include, computer-readable medium (not shown) such as a floppy drive, a disc, a tape, a Digital Versatile Disc (DVD)/compact disc (CD)-ROM drive, and a memory card. In another example embodiment of the inventive concepts, software elements may be loaded into the memory 940 through the network interface 930 instead of being loaded into the memory 940 from the separate non-transitory computer-readable medium. For example, the game routine 942 may be loaded into the memory 940 according to programs installed by files provided from developers through a network.

The bus 920 may facilitate communication and data transmission between elements of the game system 900. The bus 920 may be configured using, for example, a high-speed serial bus, a parallel bus, a storage area network (SAN), and/or other proper communication technologies.

The network interface 930 may be a computer hardware element for connecting the game system 900 to a computer network. The network interface 930 may connect the game system 900 to a computer network through a wireless or wired connection.

The touch screen 960 may be driven by the processor 910 to display game screens such as shown in FIGS. 1-7, and to obtain the user input from displayed unit interfaces through user touch (e.g., tap, swipe, etc.)

The processor 910 may be configured as a special purpose machine by executing instructions of a computer program and thus perform arithmetic operations, logic operations, and/or an input-output operation of the game system 900. The instructions may be provided to the processor 910 through the bus 920 from the memory 940 or from the network interface 930. The selection managing unit 911 and the game controller 912 included in the processor 910 may be configured to execute program codes or instructions. These program codes or instructions may be stored in a recording device (e.g., the game routine 942) such as the memory 940.

In this case, the processor 910 configured as the selection managing unit 911 and the game controller 912 may perform steps 810 and 830 of FIG. 8.

In step 810, the processor 910 may load program codes stored in at least one file of an application for the game method to a memory (e.g., the memory 940). For example, the at least one file of the application may be provided from file distribution server through a network and be installed the game system 900. When the application is executed in the game system 900, the processor 910 may load the program codes (or instructions) from the at least one file to memory.

Each of the selection managing unit 911 and the game controller 912 may be configured to execute a corresponding part of the program codes (or instructions) in the memory to process steps 820 and 830.

In step 820, the processor 910 configured as the selection managing unit 911 may determine whether a virtual button displayed on the touch screen 960 of the game system 900 is selected by a user. For one example, the selection managing unit 911 may determine selection and release of the virtual button through user touch and release of the virtual button, respectively. For another example, when one virtual button is touched, the processor 910 configured as the selection managing unit 911 may determine that the corresponding virtual button is selected. When the corresponding virtual button is selected again, the selection managing unit 911 may determine that the selection for the corresponding virtual button is released. The determination may be according to pre-stored determination routines that are selected by the processor 910.

In step 830, the processor 910 configured as the game controller 912 may control a game in progress according to an input event of the user, which is input through a game region, which is a region of the touch screen 960 that is not occupied by the virtual button. The processor 910 configured as the game controller 912 may perform different controls according to the selected virtual button. The controlling may be according to pre-stored control routines randomly selected by the processor 910.

In some example embodiments of the inventive concepts, a plurality of virtual buttons, which are displayed on different regions, may be provided. In this case, the processor 910 configured as the game controller 912 may perform different controls with respect to combinations of selected virtual buttons and input events of the user. For example, the virtual buttons may be associated with skills used in the game, respectively. The processor 910 configured as the game controller 912 may perform different controls for the same input event of the user according to a skill associated with the selected virtual button.

Step 830 may include at least one of steps 831 to 835 shown in FIG. 8.

Step 831 is a process of performing skill cancel control. In step 831, when the selection of a virtual button is verified and when an activation event according to the input event of the user is satisfied, the processor 910 configured as the game controller 912 may perform control of activating a skill associated with the virtual button. Further, in step 831, when the selection for the virtual button is released before the activation condition according to the input event of the user is satisfied, the processor 910 configured as the game controller 912 may cancel the activation of the skill.

Step 832 is a process of performing object targeting control. In step 832, when the selection of the virtual button is verified and when continuous touch input on the touch screen 960, as the input event of the user, is verified, the processor 910 configured as the game controller 912 may target one of objects displayed on the touch screen 960. Further, in step 832, when the touch input verified as the input event of the user is dragged while continuously touching the touch screen 960, the processor 910 configured as the game controller 912 may change a targeted object. For example, the object to be targeted from among the objects displayed on the touch screen 960 may be selected according to a distance from a character of the user.

Step 833 is a process of performing touch peripheral range skill control. In step 833, when the selection of the virtual button is verified and when the continuous touch input on the touch screen 960, as the input event of the user, is verified, the processor 910 configured as the game controller 912 may display an application range of a skill associated with the virtual button around a touch point on the touch screen 960. Further, in step 833, the game controller 912 may move the application range of the skill by continuously dragging the continuous touch input on the touch screen 960 and may display the moved application range of the skill on the touch screen 960. Still further, in step 833, the processor 910 configured as the game controller 912 may activate the skill associated with the virtual button when the continuous touch input on the touch screen 960 is ended, and may apply the activated skill to the application range of the skill.

Step 834 is a process of performing character peripheral range skill control. In step 834, when the selection of the virtual button is verified and when the continuous touch input on the screen 960, as the input event of the user, is verified, the processor 910 configured as the game controller 912 may display the application range of the skill associated with the virtual button around a position of the character of the user on the touch screen 960. Further, the processor 910 configured as the game controller 912 may activate the skill associated with the virtual button when the continuous touch input on the touch screen 960 is ended and may apply the activated skill to the application range of the skill.

Step 835 is a process of performing directional skill control. In step 835, when the selection of the virtual button is verified and when the touch input on the touch screen 960, as the input event of the user, is verified, the processor 910 configured as the game controller 912 may verify a direction of the touch input relative to the character of the user. Further, in step 835, the processor 910 configured as the game controller 912 may apply the skill associated with the virtual button according to the verified direction or may apply the skill according to the verified direction when the touch input is ended. For example, the processor 910 configured as the game controller 912 may change the application range of the skill or a value corresponding to the skill according to duration of the touch input.

These steps 831 to 835 may be selectively performed according to a pair in which a type of a virtual button (or a type of a skill) and a kind of an input event of the user are combined, irrespective of the order of steps 831 to 835.

As such, according to some example embodiments of the inventive concepts, the game system may provide a virtual button for selecting a skill and may perform a variety of controls according to various selection combinations between one or more virtual buttons and one or more input events of the user received through a game region (which is not occupied by the one or more virtual buttons) on the touch screen. Further, the game system according to some example embodiments may reduce a proportion at which an input interface occupies a touch screen when performing the aforementioned variety of controls. The game system may improve user conveniences and reduce constrains for game scene composition to facilitate game development by disposing a plurality of virtual buttons on a portion of the touch screen.

The foregoing devices may be realized by hardware elements, at least one processor executing software elements and/or combinations thereof. For example, the devices and components illustrated in the example embodiments of the inventive concepts may be implemented by processing circuitry such as a computer, a processor, a controller, an arithmetic logic unit (ALU), a digital signal processor, a microcomputer, a field programmable array (FPA), a programmable logic unit (PLU), a microprocessor or any device which may execute instructions and respond. A processing unit may implement an operating system (OS) or one or software applications running on the OS. Further, the processing unit may access, store, manipulate, process and generate data in response to execution of software. It will be understood by those skilled in the art that although a single processing unit may be illustrated for convenience of understanding, the processing unit may include a plurality of processing elements and/or a plurality of types of processing elements. For example, the processing unit may include a plurality of processors or one processor and one controller. Alternatively, the processing unit may have a different processing configuration, such as a parallel processor.

Software may include computer programs, codes, instructions or one or more combinations thereof and configure a processing unit to operate in a desired manner or independently or collectively control the processing unit. Software and/or data may be permanently or temporarily embodied in any type of machine, components, physical equipment, virtual equipment, computer storage media or units or transmitted signal waves to be interpreted by the processing unit or to provide instructions or data to the processing unit. Software may be dispersed throughout computer systems connected via networks and be stored or executed in a dispersion manner. Software and data may be recorded in one or more computer-readable storage media.

The methods according to the above-described example embodiments of the inventive concepts may be implemented with program instructions which may be executed by various computer means and may be recorded in computer-readable media. The computer-readable media may also include, alone or in combination with the program instructions, data files, data structures, and the like. The program instructions recorded in the media may be designed and configured specially for the example embodiments of the inventive concepts or be known and available to those skilled in computer software. Computer-readable media may include magnetic media such as hard disks, floppy disks, and magnetic tape; optical media such as CD ROM disks and DVDs; magneto-optical media such as floptical disks; and hardware devices which are specially configured to store and perform program instructions, such as a read-only memory (ROM), a random access memory (RAM), a flash memory, and the like. Program instructions may include both machine codes, such as produced by a compiler, and higher-level language codes which may be executed by the computer using an interpreter. The described hardware devices may be configured to one or more modules or units to perform the operations of the above-described example embodiments of the inventive concepts, or vice versa.

While a few example embodiments have been shown and described with reference to the accompanying drawings, it will be apparent to those skilled in the art that various modifications and variations can be made from the foregoing descriptions. For example, suitable results may be achieved even if the foregoing processes and methods are carried out in different order than described above, and/or the aforementioned elements, such as systems, structures, devices, or circuits, are combined or coupled in different forms and modes than as described above or be substituted or switched with other components or equivalents.

Therefore, other implements, other example embodiments, and equivalents to claims are within the scope of the following claims.

What is claimed is:

1. A game method in a game system implemented with a computer, the method comprising:
   determining, by a processor of the computer, whether a virtual button is selected by a user from among one or more virtual buttons displayed on a first portion of a touch screen of the game system;
   controlling, by the processor, a game in progress according to an input event of the user, which is input through a second portion of the touch screen, the second portion being different from the first portion; and
   performing, by the processor, different controls according to the virtual buttons respectively selected by the user, the performing different controls including,
      performing a first control of activating a skill associated with the selected virtual button in response to both a selection of the selected virtual button being verified and an activation condition for the input event of the user being satisfied, and
      performing a second control of cancelling the activation of the skill associated with the selected virtual button in response to the selection of the selected virtual button being released before the activation condition for the input event of the user is satisfied,
   wherein the performing different controls includes displaying an application range of the skill associated with the selected virtual button around at least one of a touch point or a position of a character of the user on the touch screen in response to both the selection of the selected virtual button being verified and a continuous touch input, as the input event of the user, on the touch screen being verified, and
   the performing different controls includes,
      in response that a first virtual button associated with a range skill among the virtual buttons is selected by the user, selecting an application range of the range skill based on the input event of the user, and performing a control of activating the range skill such that the range skill is applied to an object included in the application range of the range skill, and
      in response that a second virtual button associated with a directional skill among the virtual buttons is selected by the user, selecting a direction for applying of the directional skill based on the input event of the user, and performing a control of activating the directional skill based on the selected direction for applying of the directional skill such that the directional skill is applied to an object located in the selected direction.

2. The method of claim 1, wherein the one or more virtual buttons comprises a plurality of virtual buttons displayed on different regions, and
   the performing different controls include performing the different controls per pairs, respectively, in each of which the selected virtual button selected among the plurality of virtual buttons and the input event of the user are combined.

3. The method of claim 1, wherein the one or more virtual buttons are associated with one or more skills used on the game, respectively, and the performing different controls include performing the different controls, for a same input event of the user, according to different skills associated with the one or more virtual buttons selected by the user, respectively.

4. The method of claim 1, wherein the performing different controls comprises:

performing control of targeting an object from among objects displayed on the touch screen in response to both the selection of the selected virtual button being verified and the continuous touch input, as the input event of the user, on the touch screen being verified.

5. The method of claim 4, wherein the performing different controls comprises:

performing a control of changing an object to be targeted in response to the touch input verified as the input event of the user being dragged while continuously touching the touch screen.

6. The method of claim 4, wherein the object to be targeted among the objects displayed on the touch screen is selected according to a distance from the character of the user.

7. The method of claim 1, wherein the performing different controls further comprises:

activating the skill associated with the selected virtual button in response to the continuous touch input on the touch screen being ended; and applying the activated skill to the application range of the skill.

8. The method of claim 1, wherein the performing different controls comprises:

in response to both the selection of the selected virtual button being verified and the continuous touch input, as the input event of the user, on the touch screen being verified, verifying a direction of the continuous touch input relative to the character of the user; and applying the skill associated with the selected virtual button according to the verified direction or applying the skill according to the verified direction in response to the continuous touch input being ended.

9. The method of claim 1, wherein the performing different controls comprises:

changing the application range of the skill associated with the selected virtual button or a value corresponding to the skill associated with the selected virtual button according to duration of the touch input on the second portion of the touch screen.

10. The method of claim 1, wherein the selected virtual button is on one side of the touch screen.

11. A non-transitory computer-readable medium having embodied thereon instructions that when executed by the processor to cause the processor to perform the method of claim 1.

12. A game system implemented with a computer, the system comprising:

at least one processor configured to execute computer-readable instructions which configure the processor to,
determine whether a virtual button displayed on a first portion of a touch screen is selected by a user from among one or more virtual buttons,
control a game in progress according to an input event of the user, which is input through a second portion of the touch screen, the second portion being different from the first portion, and
perform different controls according to the virtual buttons respectively selected by the user, wherein the processor is further configured to,
perform a first control of activating a skill associated with a virtual button selected from among the selected virtual buttons in response to both a selection of the selected virtual button being verified and an activation condition for the input event of the user being satisfied, and
perform a second control of cancelling the activation of the skill associated with the selected virtual button in response to the selection of the selected virtual button being released before the activation condition for the input event of the user is satisfied, wherein the processor is further configured to display an application range of the skill associated with the selected virtual button around at least one of a touch point or a position of a character of the user on the touch screen in response to both the selection of the selected virtual button being verified and a continuous touch input, as the input event of the user, on the touch screen being verified, and wherein in response that a first virtual button associated with a range skill among the virtual buttons is selected by the user, the processor is configured to perform the different controls by selecting an application range of the range skill based on the input event of the user, and performing a control of activating the range skill such that the range skill is applied to an object included in the application range of the range skill, and in response that a second virtual button associated with a directional skill among the virtual buttons is selected by the user, the processor is configured to perform the different controls by selecting a direction for applying of the directional skill based on the input event of the user, and performing a control of activating the directional skill based on the selected direction for applying of the directional skill such that the directional skill is applied to an object located in the selected direction.

13. The system of claim 12, wherein the one or more virtual buttons comprise a plurality of virtual buttons displayed on different regions, and wherein the processor is further configured to perform the different controls per pairs, respectively, in each of which the selected virtual button selected among the plurality of virtual buttons and the input event of the user are combined.

14. The system of claim 12, wherein the one or more virtual buttons are associated with one or more skills used on the game, respectively, and wherein the processor is further configured to perform the different controls for a same input event of the user, according to skills associated with the one or more virtual buttons selected from among the one or more virtual buttons by the user, respectively.

15. The system of claim 12, wherein the processor is further configured to perform control of targeting an object from among objects displayed on the touch screen in response to both the selection of the selected virtual button being verified and the continuous touch input, as the input event of the user, on the touch screen being verified.

16. The system of claim 12, wherein when the processor is further configured to display the application range of the skill associated with the selected virtual button around the touch point on the touch screen in response to both the selection of the selected virtual button being verified and the continuous touch input, as the input event of the user, on the touch screen being verified, the processor is further configured to move the application range of the skill by dragging the continuous touch input on the touch screen in a continuous manner and display the moved application range of the skill on the touch screen.

17. The system of claim 12, wherein when the processor is further configured to display the application range of the skill associated with the selected virtual button around the position of the character of the user on the touch screen in response to both the selection of the selected virtual button being verified and the continuous touch input, as the input event of the user, on the touch screen being verified, the processor is further configured to perform the different controls by activating the skill associated with the selected virtual button in response to the continuous touch input on the touch screen being ended and applying the activated skill to the application range of the skill.

18. The system of claim 12, wherein the processor is further configured to verify a direction of the continuous touch input being on the second portion of the touch screen and being relative to the character of the user in response to both the selection of the selected virtual button being verified and the continuous touch input, as the input event of the user, on the touch screen being verified, and wherein the processor is configured to apply the skill associated with the selected virtual button according to the verified direction or apply the skill according to the verified direction in response to the continuous touch input being ended.

\* \* \* \* \*